Patented Jan. 15, 1946

2,392,811

UNITED STATES PATENT OFFICE 2,392,811

FERTILIZER AND MAKING SAME

Eric W. Eweson, New York, N. Y.

No Drawing. Application April 7, 1943,
Serial No. 482,147

7 Claims. (Cl. 71—9)

This invention relates to fertilizers and to the process of producing the same, more particularly to a micro-organic vitamin-rich fertilizer which includes in its composition yeast and lignin, and has for an object the provision of improvements in this art. This application is a continuation-in-part of my copending application, Serial No. 382,979, filed March 12, 1941.

The fertilizer may be and preferably is made from the waste liquor from the sulphite pulp process. This material is plentiful and normally an objectionable, acid refuse which is difficult to dispose of and pollutes the streams into which it usually is discharged. Some efforts have been made to put the material to economic use and certain small amounts are used for the production of baker's yeast, but the total requirements of all known uses scarcely touch the supply. Yeast propagation in the neutralized liquor is possible because of its sugar content. The liquor also has considerable lignin content which, however, is a disadvantage in normal yeast manufacture and every care is taken to insure that it is not contained in the final product.

One yeast production process, using sulphite waste liquor, which has been successful is known as the Heijkenskjold process and is described in one form in the patent to Heijkenskjold, Number 1,881,557. In this process the yeast growth is started in a sugar solution to which neutralized waste sulphite liquor is gradually added and also yeast nutrient salts with accompanying intense aeration which reduces to a minimum the formation of alcohol and counteracts the toxic effect of the lignin on the yeast fungi. Other yeast nutrient salts are added in excess of the amount required for fungi growth. After the yeast propagation process is terminated the yeast is carefully freed from the lignin and the non-assimilated yeast nutrient salts by repeated separations and washings.

Baker's yeast consists of a particular race of fungus, Saccharomyces ceriviseae, and utilizes only certain varieties of the sugars contained in sulphite liquor. The other sugars as well as the non-assimilable excess of yeast nutrient salts and the lignin are hence wasted in the production of baker's yeast from waste sulphite liquor.

According to the present process it is possible to propagate various races of yeast because a number are suitable for fertilizer which would have no value for baker's uses; hence it is possible to utilize practically all of the sugars contained in the waste sulphite liquor. In addition, the non-assimilated yeast nutrient salts and the lignin which were previously wasted are used in their entirety, and in fact form very valuable ingredients of the fertilizer.

It has long been recognized that yeast would be useful as a fertilizer. Its use, however, has been substantially nil because of the prohibitive cost of propagating it by usual methods. Moreover, when used alone and unless specially protected its full value is not realized because under certain common conditions it tends to disintegrate and disappears from the soil with greatly reduced benefit to the plants.

So, although the Heijkenskjold process provides a more inexpensive yeast, so far as known there has been no previous attempt to use it as a fertilizer, and particularly no attempt to combine protective and balancing substances with it to make it fully available as required by growing plants. Such utilization is provided by the present process.

In the practice of the present process the yeast is combined with lignin. Lignin itself has valuable properties as a soil improver, one being its highly hygroscopic nature enabling it to absorb water and plant nutrients. Another is that lignin is almost impervious to decomposition by micro-organisms and its soil improving properties are therefore of long duration.

The complete fertilizer may be produced from sulphite waste liquor by a variation of the Heijkenskjold process and it has the advantage over that process in that it preferably employs various races of yeast instead of one and thus utilizes practically all of the sugars contained in the sulphite waste liquor. The Heijkenskjold process may be followed closely in the initial stages up to the propagation of the yeast so there is no need to describe it at length, reference being made to the aforementioned Heijkenskjold patent. However, it is to be noted that even in this known process a variation is introduced in that different races of yeast are preferably employed instead of the one which is useful for baking purposes, and that these other races may be hardier and easier to propagate under the adverse conditions which necessarily exist at best in connection with yeast propagation in sulphite waste liquor. At the stage before the Heijkenskjold process is concluded the present process departs completely. Instead of washing away the lignin and the non-assimilated yeast nutrient salts as is absolutely necessary for the utilization of the yeast for baking, these normally undesired waste products are retained with the yeast, the excess water only being eliminated by dehydrating the entire yeast mash in one of a number of known ways.

The dehydration or drying step is preferably carried out in such manner as to prevent any substantial destruction of the yeast vitamins and to preserve an appreciable part of the yeast in a live though dormant state. The temperature of the drying is about 200 degrees F. with some permissible variations depending on the time and method of drying. For example, in order to preserve a maximum amount of vitamins and live yeast cells it may be economical to increase the time and cost of the drying procedure by lowering the temperature at certain stages to approximately 140 degrees F.

In the product so produced the maximum value of the yeast can be made available to the plants, and moreover the desirable properties of the lignin and the non-assimilated yeast nutrient salts are also realized. These salts, mainly compounds of nitrogen and phosphorus, are valuable directly as plant fertilizer and are commonly used as such.

In combination with yeast, lignin thus has two important functions:

1. The lignin forms a protective coating around the yeast cells which has the effect of furnishing them protection from disintegration unless there is sufficient moisture in the soil to penetrate the lignin coating. This is important because without such moisture there can be no utilization of the yeast components by the plants any way. For instance, unprotected yeast would under dry soil conditions, notably on the surface of the soil, disintegrate rapidly with very much reduced benefit to the plants; whereas with the protective water-soluble lignin coating the yeast cells will be protected until moisture conditions are such that the yeast components can be utilized by the soil bacteria and then assimilated by the plants. At such time and no sooner will the lignin coating be penetrated and the yeast cells exposed.

2. Lignin also has the function of absorbing and storing nutrients released by the disintegration of the yeast cells, in the same manner as the lignin will absorb the non-assimilated yeast nutrients of the propagation mash. In this manner lignin acts as a balancer between the supply and demand of nutrients released by the disintegration of the yeast.

In order to serve the first purpose, only very small quantities of lignin would be required. To serve both purposes it is desirable to have considerable excess of lignin combined with the yeast. Lignin will for instance absorb and retain as much as 14% of its own weight in potash. Assuming that lignin has approximately the same capacity with respect to other fertilizer salts, I propose to have present from five to ten times as much lignin as yeast, figured on dry substance, which figures might be varied for different soil conditions as for example whether rich or poor in humus. If yeast and lignin were used in the proportions obtainable on the average in a normal sulphite liquor yeast propagation wort, such proportions can be made to vary from five to ten parts lignin to one part of yeast, depending on the races of yeast and conduct of the propagation, thus agreeing with the suggested proportions.

As a specific example of the process, the sulphite waste liquor is neutralized, and, a vigorous yeast culture having been started in a sugar solution, the prepared liquor is added to the growing yeast, with the addition of excess amounts of yeast nutrient salts and with intense aeration of the wort, all as more fully set forth in the Heijkenskjold patent. Different races of yeast may be used in addition or as alternative to the particular species useful for baking according to the patent. The resultant final yeast mash is then dehydrated and the product may in this state be kept indefinitely.

This product can be used alone as a fertilizer and soil improver or it can be mixed with other fertilizer components to act with them and increase their efficiency.

It is thus seen that the method provides a new and very valuable micro-organic vitamin-bearing fertilizer and one which can be inexpensively produced from a normally objectionable waste product. Also that by the preferred method a number of hardy yeast races are propagated to utilize a maximum of the sugar content of the sulphite waste liquor with correspondingly higher yields of yeast and simplified propagation process.

While the method has been particularly described in connection with the production of fertilizer from sulphite waste liquor because this provides a bountiful source of raw material at practically no cost, thus making the product sufficiently cheap for general use, it is to be understood that yeast and lignin and such other ingredients as are desired in the fertilizer may be obtained from other sources whenever feasible.

It is to be noted that an advantage of the process is the ability of the lignin to absorb the excess of nutrient salts which are not assimilated in the yeast propagation. Also it provides a fertilizer which will remain available for long periods of time, the lignin reducing the loss from the soil of the other components through excessive dryness or moisture. By dehydration of the whole yeast mash without the separation of the yeast from the mash, all the valuable fertilizing contents of the non-assimilated yeast nutrient salts as well as of the yeast and the lignin are retained in the final product.

While one embodiment of the invention has been described for purposes of illustration, it is to be understood that the invention may have various embodiments within the limits of the prior art and the scope of the subjoined claims.

I claim as my invention:

1. The process of preparing a hygroscopic fertilizer from sulphite waste liquor containing lignin in solution which comprises, producing yeast from the liquor by fermentation accompanied by vigorous aeration while adding yeast nutrient salts in excess of the amount required by the yeast, and maintaining the lignin in solution, said yeast being substantially free from alcohol, and drying the whole mash at a temperature sufficiently low to preserve vitamins and live yeast in admixture with the water-soluble lignin and nutrient salts in the wort as a complete protective coating on the yeast cells.

2. The process of preparing a hygroscopic fertilizer from sulphite waste liquor containing lignin in solution which comprises, producing yeast from the liquor by fermentation accompanied by intense aeration, and maintaining the lignin in solution, said yeast being substantially free from alcohol, and drying the whole mash at a temperature sufficiently low to preserve live yeast in admixture with the water-soluble lignin in the wort as a complete protective coating on the yeast cells.

3. The process as set forth in claim 2 wherein the dehydration procedure is conducted at a temperature of not higher than 200 degrees F. to avoid agglutinization of the yeast while preserving some live yeast in the dormant state and preserving considerable amounts of the vitamin content.

4. A hygroscopic fertilizer composed of the whole dried residue of sulphite waste liquor yeast propagation mash including yeast, which is substantially free from alcohol, together with water-soluble lignin and yeast nutrient salts as a complete protective coating on the yeast cells.

5. A hygroscopic fertilizer composed of the dried residue of sulphite waste liquor yeast propagation mash including yeast, substantially free from alcohol together with water-soluble lignin as a complete protective skin coating on the yeast cells.

6. A dry solid hygroscopic fertilizer composed substantially of water-soluble lignin and yeast which is free from alcohol, the lignin forming a complete protective skin coating on the yeast cells.

7. A dry solid hygroscopic fertilizer composed substantially of water-soluble lignin, vitamins, and yeast which is free from alcohol, the lignin forming a complete protective skin coating on the yeast cells.

ERIC W. EWESON.